United States Patent
Tang et al.

(10) Patent No.: US 7,701,093 B2
(45) Date of Patent: Apr. 20, 2010

(54) LINEAR MOTOR

(75) Inventors: Yuqi Tang, Ueda (JP); Satoshi Sugita, Tomi (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 12/044,383

(22) Filed: Mar. 7, 2008

(65) Prior Publication Data

US 2008/0218005 A1    Sep. 11, 2008

(30) Foreign Application Priority Data

Mar. 8, 2007    (JP) .............................. 2007-058754

(51) Int. Cl.
    *H02K 41/00*    (2006.01)
(52) U.S. Cl. .................................. 310/12.01
(58) Field of Classification Search ................. 310/12, 310/15
    See application file for complete search history.

(56) References Cited

U.S. PATENT DOCUMENTS 5,196,745 A  *  3/1993 Trumper ...................... 310/12
2005/0104456 A1*  5/2005 Yajima et al. ................. 310/14

FOREIGN PATENT DOCUMENTS

| JP | 11-308850   |   | 11/1999  |
|----|-------------|---|----------|
| JP | 2003-18818  | * | 7/2001   |
| JP | 2004-289895 | * | 10/2004  |

* cited by examiner

*Primary Examiner*—Nguyen N Hanh
(74) *Attorney, Agent, or Firm*—Rankin, Hill & Clarke LLP

(57) ABSTRACT

When a pitch between centers of two adjacent magnetic pole portions disposed on an armature is defined as τs, the length W of permanent magnets disposed in the middle is equal to the pitch τs (W=τs). The length of each of the two end permanent magnets respectively disposed at either end of a permanent magnet magnetic pole row is denoted by W1. A ratio w1/W of the length W1 to the length W is defined as 0.43<W1/W<0.49. With this definition, cogging torque of a linear motor may sufficiently be reduced.

4 Claims, 4 Drawing Sheets

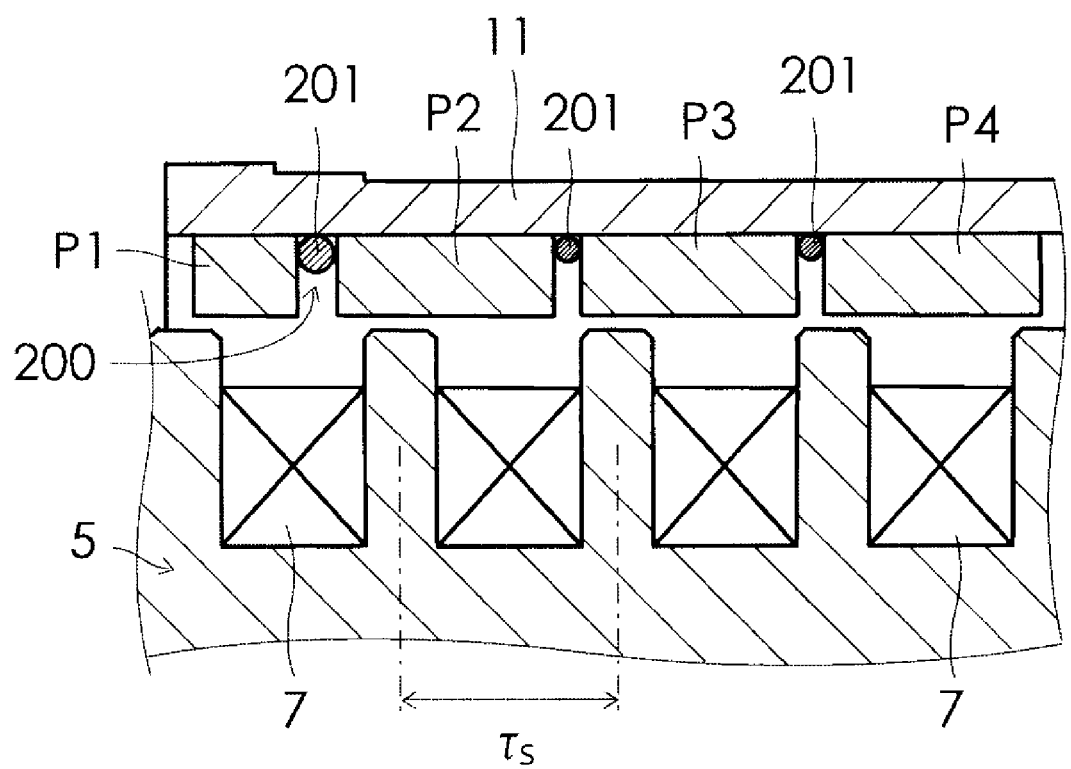

LINEAR MOTOR

FIELD OF THE INVENTION

The present invention relates to a linear motor.

BACKGROUND OF THE INVENTION

Japanese Patent Publication No. 11-308850 discloses a linear motor which includes a stator and a movable element so that the movable element may reciprocate with respect to the stator, and further includes an armature disposed on one of the stator and the movable element and a permanent magnet magnetic pole row disposed on the other of the stator and the movable element. The armature of the linear motor has an iron core having three or more magnetic pole portions arranged along a moving direction of the movable element, and armature windings of three phases respectively wound around the three or more magnetic pole portions of the iron core. The permanent magnet magnetic pole row has a frame of a nonmagnetic material and a plurality of permanent magnets disposed in through-holes formed in the frame. The plurality of permanent magnets are disposed at a given interval in a row along the moving direction of the movable element so that north poles and south poles may alternately be arranged. The permanent magnet magnetic pole row faces the magnetic pole portions with a given gap therebetween. To reduce the cogging torque, in this linear motor, a length W1, as measured in the moving direction, of each of two permanent magnets which are respectively disposed at either end of the permanent magnet magnetic pole row is defined to be less than a length W, as measured in the moving direction, of the remaining permanent magnets, and that a ratio W1/W of the length W1 to the length W is defined as 0.5<W1/W<0.6. In addition, when a pitch between centers of two adjacent magnetic pole portions of the plurality of magnetic pole portions constituting the armature is defined as τs, and a pitch between the center of one of the two permanent magnets respectively disposed at either end of the permanent magnet magnetic pole row and the center of the permanent magnet adjacent thereto is defined as $\lambda'$, a ratio $\lambda'/\tau s$ of the pitch $\lambda'$ to the pitch τs is defined as $0.9<\lambda'/\tau s<1.0$.

However, it is not possible to sufficiently reduce the cogging torque in conventional linear motors.

SUMMARY OF THE INVENTION

It is therefore an object of the present invention to provide a linear motor in which the cogging torque can sufficiently be reduced.

A linear motor, of which improvement is aimed by the present invention, includes a stator and a movable element. An armature is disposed on one of the stator and the movable element. The armature includes an iron core having three or more magnetic pole portions arranged along a moving direction of the movable element and armature windings of three phases wound around the iron core to excite the three or more magnetic pole portions. A permanent magnet magnetic pole row is disposed on the other of the stator and the movable element. The permanent magnet magnetic pole row includes a base made of a magnetic material and a plurality of permanent magnets disposed on the base at a given interval in a row along the moving direction so that north poles and south poles may alternately be arranged. The plurality of permanent magnets are arranged to face the three or more magnetic pole portions with a given gap therebetween. A length W1, as measured in the moving direction, of each of two permanent magnets which are respectively disposed at either end of the permanent magnet magnetic pole row is less than a length W, as measured in the moving direction, of the remaining permanent magnets. The number of slots per pole per phase is ⅜, three-eighths. Here, the number of slots per pole per phase is defined as a value obtained by dividing the number of slots of the armature by the number of poles of the permanent magnet magnetic poles, and further dividing the quotient by the number of phases of the armature windings.

In one aspect of the present invention, when a pitch between centers of two adjacent magnetic pole portions of the plurality of magnetic pole portions constituting the armature is defined as τs, the length W of the remaining plurality of permanent magnets is defined as W=τs, and a ratio W1/W of the length W1 to the length W is defined as 0.43<W1/W<0.49. After keenly studying, the inventors of the present invention have found that the cogging torque can be reduced to a practically acceptable level by defining the ratio W1/W as 0.43<W1/W<0.49. It may be considered that the cogging torque may effectively be negated due to the arrangement of permanent magnets as described above, namely, when the ratio W1/W is defined within the above-mentioned range. When the ratio W1/W is 0.43 or less, or the ratio W1/W is 0.49 or more, the cogging torque increases to an unacceptable level or beyond an allowable level. The present invention is based on the discovery that the cogging torque takes the minimum value when the ratio W1/W falls within the above-mentioned range.

In another aspect of the present invention, a linear motor may include a plurality of permanent magnet magnetic pole rows. When a plurality of the permanent magnets disposed at one side ends of the plurality of permanent magnet magnetic pole rows are different in length from one another as measured in the moving direction and an average length of the permanent magnets disposed at the one side ends is defined as W10, and when a plurality of the permanent magnets disposed at the other side ends of the plurality of permanent magnet magnetic pole rows are different in length from one another as measured in the moving direction and an average length of the permanent magnets disposed at the other side ends thereof is defined as W20, the permanent magnet magnetic pole rows may be configured so that a ratio W10/W of the average length W10 to the length W is 0.43<W10/W<0.49 and a ratio W20/W of the average length W20 to the length W is 0.43<W20/W<0.49. Within the above-defined ratios, the present invention is then applicable.

Preferably, a spacer, which is made of a nonmagnetic material, is disposed between two adjacent permanent magnets of the plurality of permanent magnets to form a space therebetween. In this manner, the presence of the spacer can prevent electrical short between two adjacent permanent magnets.

The spacer may be made by cutting a conventional wire material at low manufacturing cost.

In a further aspect of the present invention, the permanent magnet magnetic pole row may be disposed on the movable element and the armature may be disposed on the stator. In this arrangement, the base may be formed in a cylindrical or columnar shape and the plurality of permanent magnets may be fixed onto an inner peripheral surface of the base. The stator may partially be arranged inside the movable element. The armature may be fixed onto a base station via a stator fixture at both ends thereof in the moving direction of the movable element. A guide block may be fixed to the movable element and the guide block may slidably be supported by a guide rail disposed on the base station. Thus, the movable element is capable of moving in the moving direction with respect to the stator as the guide block slides on the guide rail.

With this arrangement, the movable element can be moved with respect to the stator with a simple configuration.

BRIEF DESCRIPTION OF THE DRAWINGS

FIG. 6 is a partially enlarged view showing a linear motor of a further embodiment of the present invention.

DETAILED DESCRIPTION OF THE PREFERRED EMBODIMENTS

Figure 1:
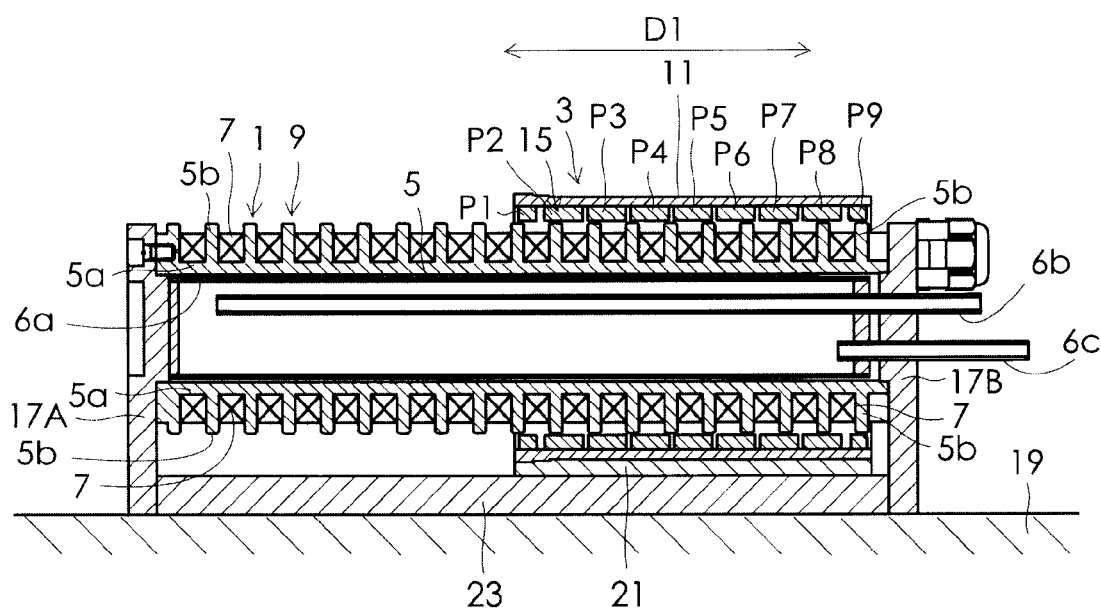
FIG. 1 is a cross-sectional view of a linear motor according to one embodiment of the present invention.

Preferred embodiments of the present invention will now be described with reference to the accompanying drawings. FIG. 1 is a cross-sectional view of a cylindrical linear motor according to one embodiment of the present invention. The linear motor of this embodiment includes a stator 1 and a movable element 3 as shown in FIG. 1. The stator 1 comprises an armature 9 that includes an iron core 5 and a plurality of armature windings 7. The iron core 5 has a cylindrical yoke 5a and a plurality of magnetic pole portions 5b extended from the yoke 5a. An annular slot is formed between two adjacent magnetic pole portions 5b. The plurality of armature windings 7 are respectively wound around the plurality of annular slots via insulators in a circumferential direction of the cylindrical yoke. In this embodiment, the plurality of armature windings 7 are disposed so that three phases are arranged in the order of U-phase, -U-phase, U-phase, V-phase, -V-phase, V-phase, W-phase, -W-phase, and W-phase. The flow of magnetic flux from the armature is explained in detail in Japanese Patent Application Publication No. 11-332211 (JP11-332211A) and other documents.

A copper tank 6a is provided inside the cylindrical yoke 5a. Cooling water is supplied to the tank 6a via a supply pipe 6b and is discharged therefrom via a discharge pipe 6c. Thus the cooling water circulates in the copper tank 6a to cool the armature 9.

The movable element 3 includes a cylindrical base 11 made of a soft magnetic material such as silicon steel sheets, and a permanent magnet magnetic pole row 15 attached onto an inner peripheral surface of the base 11. The permanent magnet magnetic pole row 15 has a plurality of (nine in this embodiment) permanent magnets P1 to P9. The armature 9 is partially arranged inside the permanent magnet magnetic pole row 15, which is cylindrical in shape, so that the permanent magnets P1 to P9 and the plurality of magnetic pole portions 5b may face each other. The movable element 3 reciprocates in an extending direction of the yoke 5a of the iron core 5 (that is, the moving direction indicated by an arrow D1). The permanent magnets P1 to P9 of the permanent magnet magnetic pole row 15, namely, the first to Mth permanent magnets (where M is a natural number of four or more; M is nine in this embodiment) are arranged at a given interval in a row along the moving direction so that north poles and south poles may be alternately arranged. Each of the first to the ninth (Mth) permanent magnets P1 to P9 is constituted from a cylindrical permanent magnet. Therefore, the outer outline of the permanent magnet P1 to P9 (Mth) is a ring in shape. In this embodiment, nine permanent magnets are used in the linear motor. The length of the first and the ninth permanent magnets P1 and P9 is half or even less than the length of the remaining permanent magnets. For this reason, the first and ninth permanent magnets P1 and P9 are counted together as one pole. As a result, the number of poles of the permanent magnet magnetic pole row 15 is regarded as eight in total. In a portion of the armature 9 that faces the permanent magnet magnetic row 15, the number of slots is nine. As mentioned above, the current of three phases flows through the plurality of armature windings 7. Accordingly, the number of slots per pole per phase for the linear motor of this embodiment is calculated as ⅜, three-eighths.

The iron core 5 of the linear motor according to this embodiment is fixed to stator fixtures 17A and 17B at both ends thereof in the moving direction D1. The stator fixtures 17A and 17B are fixed onto a base station 19. A guide block 21 is fixed to a lower portion of the movable element 3, and is slidably supported by a guide rail 23 disposed on the base station 19. With this configuration, the movable element 3 is capable of moving in the moving direction D1 with respect to the stator 1 as the guide block 21 slides on the guide rail 23.

Figure 2:
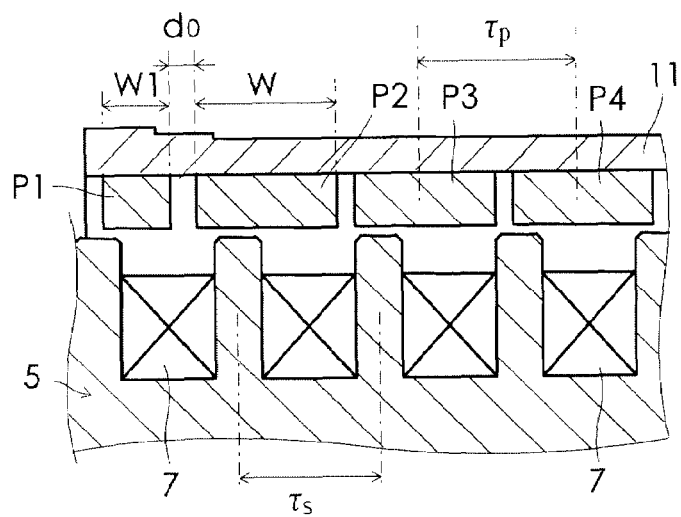
FIG. 2 is a partially enlarged view of FIG. 1.

As shown in FIG. 2, which is a partially enlarged view of FIG. 1, the permanent magnets other than two permanent magnets disposed at the ends of the permanent magnet magnetic row, namely, the permanent magnets P2 to P8 (the permanent magnets disposed in the middle of the permanent magnet magnetic row as viewed in the moving direction) other than the first and ninth permanent magnets P1 and P9 (Mth) in the permanent magnet magnetic row 15 have the same length W as measured in the moving direction D1 of the movable element. Hereinafter, the permanent magnets P2 to P8 are called as middle permanent magnets P2 to P8, and the first and ninth permanent magnets P1 and P9 are called as end permanent magnets P1 and P9. The end permanent magnets P1 and P9 have the same length W1 as measured in the moving direction D1, which is shorter than the length W of the middle permanent magnets P2 to P8. The fifth to the ninth permanent magnets P5 to P9 are not illustrated in FIG. 2. When a pitch between centers of two adjacent magnetic pole portions 5b of the armature 9 is defined as τs, the pitch τs is equal to the length W of the middle permanent magnets P2 to P8, namely, W=τs. A ratio W1/W of the length W1 of the end permanent magnets P1 and P9 to the length W of the middle permanent magnets P2 to P8 is 0.43<W1/W<0.49. When a distance between the end permanent magnet P1 and its adjacent middle permanent magnet P2, and a distance between the end permanent magnet P9 and its adjacent middle permanent magnet P8 are respectively defined as $d_o$ and a pitch between centers of two adjacent permanent magnets among the middle permanent magnets P2 to P8 is defined as τp, a ratio $(d_o+W1)/τp$ of the sum of $d_o$ and the length W1 to the pitch τp is 0.6<$(d_o+W1)/τp$<0.66.

Figure 3:
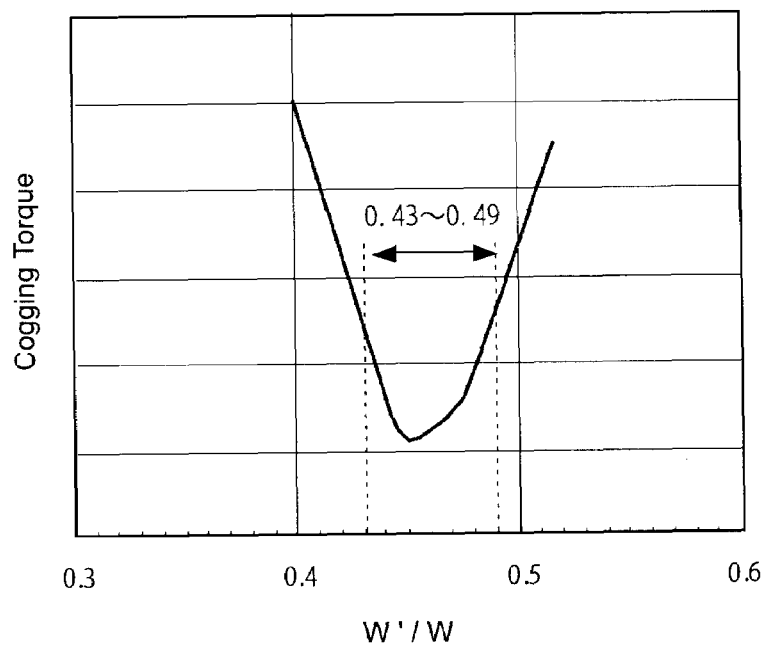
FIG. 3 is a graph showing the relationship between cogging torque and a ratio W1/W of a linear motor used in the test.

Next, the relationship between the cogging torque and the ratio W1/W was studied by varying the value of W1/W for the linear motor of this embodiment. For the linear motor used in the test, the length W is 12 mm, the pitch τs is 12 mm, the distance $d_o$ is 3 mm, the pitch τp is 13.5 mm, and the thickness of the permanent magnets P1-P9 is 4 mm each. The ratio W1/W was varied by changing the value of the length W1. FIG. 3 shows measurement results. It is obvious from FIG. 3 that the cogging torque was suppressed in the range of 0.43<W1/W<0.49.

Figure 4:
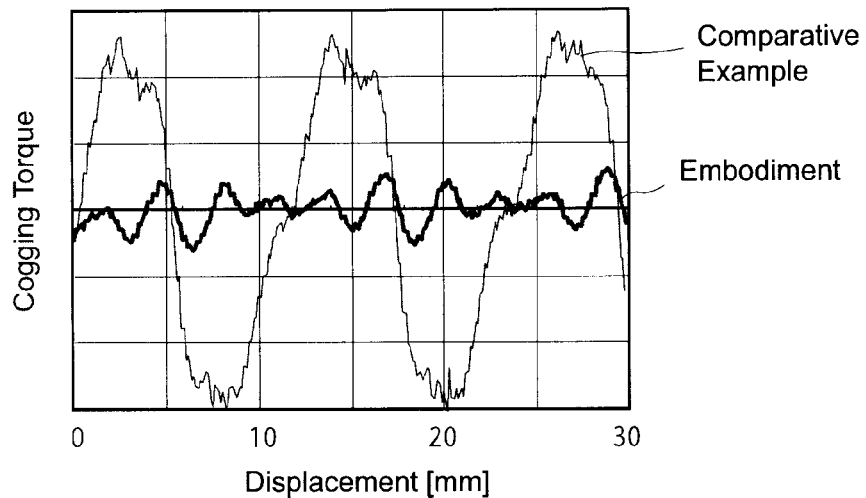
FIG. 4 is a graph showing the relationship between cogging torque and displacement for a movable element of the present invention as well as for a linear motor of a comparative example, wherein the ratios W1/W are different in these linear motors.

Next, the relationship between the cogging torque and displacement of the movable element was studied for the linear motor of this embodiment wherein the ratio W1/W is 0.45, and for a linear motor of a comparative example wherein the ratio W1/W is 0.54. Here, both of the linear motors of this embodiment and the comparative example have the same length W of 12 mm, while they differ in length W1. FIG. 4 shows measurement results. It is obvious from FIG. 4 that changes in cogging torque with respect to displacement of the movable element are smaller in the linear motor of this embodiment than in the linear motor of the comparative example.

Figure 5:
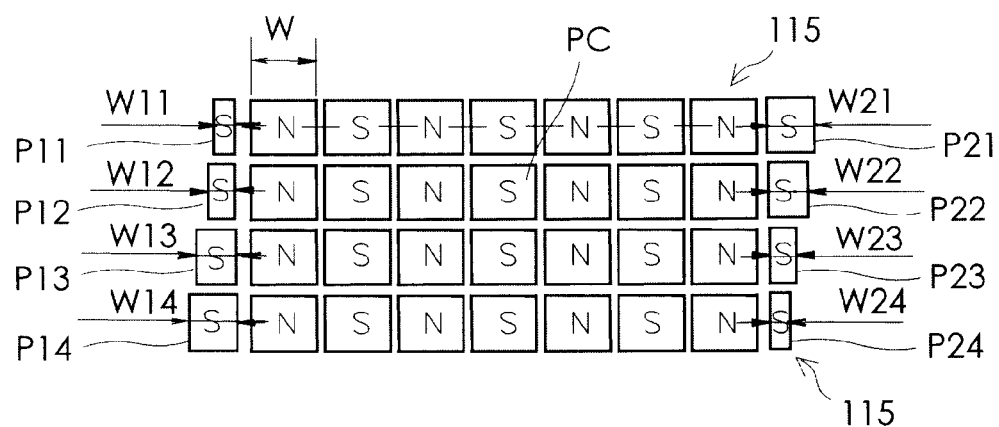
FIG. 5 is an exploded plan view showing half (four) of eight permanent magnet magnetic pole rows according to another embodiment of the present invention.

FIG. 5 shows permanent magnet magnetic pole rows 115 of a linear motor according to another embodiment of the present invention. In the linear motor of this embodiment, each permanent magnet is an arc in shape and there are eight permanent magnet magnetic pole rows 115. FIG. 5 is an exploded plan view showing half (four) of the eight permanent magnet magnetic pole rows 115. The linear motor of this embodiment has another half (four) of the permanent magnet rows 115 which are similar to those shown in FIG. 5. As shown in FIG. 5, middle permanent magnets PC other than end permanent magnets P11 to P14 and P21 to P24 respectively disposed at either ends of the eight permanent magnet magnetic pole rows 115, have the same length W as measured in the moving direction D1.

The end permanent magnets P11 to P14 disposed at one-side ends of the eight permanent magnet magnetic pole rows 115 have different lengths W11 to W14, as measured in the moving direction D1. The lengths W11 to W14 are less than the length W, as measured in the moving direction D1, of the middle permanent magnets PC. Further, when an average length of the lengths W11 to W14 of the permanent magnets P11 to P14 is defined as W10, a ratio W10/W of the average length W10 to the length W of the middle permanent magnets PC is 0.43<W10/W<0.49. Similarly, the ninth (Mth) permanent magnets P21 to P24 disposed at the other-side ends of the eight permanent magnet magnetic pole rows 115 have different lengths W21 to W24, as measured in the moving direction D1. The lengths W21 to W24 are less than the length W of the middle permanent magnets PC as measured in the moving direction. Further, when an average length of the lengths W21 to W24 of the permanent magnets P21 to P24 is defined as W20, a ratio W20/W of the average length W20 to the length W of the middle permanent magnets P2 to P8 is 0.43<W20/W<0.49.

Also, in the embodiment shown in FIG. 5, pitches between centers of adjacent middle permanent magnets PC are equal to each other. A distance between the end permanent magnets P11 to P14 and their adjacent middle permanent magnets PC, and a distance between the end permanent magnets P21 to P24 and their adjacent middle permanent magnets PC may respectively be defined as $d_o$ as with the previous embodiment. A pitch between centers of two adjacent permanent magnets among the middle permanent magnets P2 to P8 may be defined as $\tau p$. An average length of the lengths W11 to W14 of the end permanent magnets P11 to P14 may be defined as W10 or an average length of the lengths W21 to W24 of the end permanent magnets P21 to P24 may be defined as W20. Then, a ratio $(d_o+W10)/\tau p$ (a ratio of the sum of the distance $d_o$ and the average length W10 of four end permanent magnets to the pitch $\tau p$) or a ratio $(d_o+W20)/\tau p$ (a ratio of the sum of the distance $d_o$ and the average length W20 of four end permanent magnets to the pitch $\tau p$) may be defined as $0.6<(d_o+W10)/\tau p<0.66$ or $0.6<(d_o+W20)/\tau p<0.66$.

For the linear motor of this embodiment, a similar test result as shown in FIG. 4 was obtained.

FIG. 6 is a partially enlarged view showing a linear motor of a further embodiment of the present invention. In the linear motor of this embodiment, spacers 201 are respectively disposed between two adjacent permanent magnets of the plurality of permanent magnets P1 to P9 to form spaces 200 therebetween. Other configuration is similar to that of the linear motor of FIG. 2. The spacer 201 is formed by cutting an aluminum wire made of a nonmagnetic material having a diameter which is equal to the width of the space 200.

The present invention is not limited to these embodiments, but various variations and modifications may be made without departing from the scope of the present invention.

What is claimed is:

1. A linear motor which includes a stator and a movable element, comprising:
    an armature disposed on one of the stator and the movable element, the armature including:
        an iron core having three or more magnetic pole portions arranged along a moving direction of the movable element; and
        armature windings of three phases wound around the iron core to excite the three or more magnetic pole portions; and
    a permanent magnet magnetic pole row disposed on the other of the stator and the movable element, the permanent magnet magnetic pole row including:
        a base made of a magnetic material; and
        a plurality of permanent magnets disposed at a given interval in a row along the moving direction on the base so that north poles and south poles may alternately be arranged, the plurality of permanent magnets facing the three or more magnetic pole portions with a given gap therebetween; wherein
    a length W1, as measured in the moving direction, of each of two permanent magnets which are respectively disposed at either end of the permanent magnet magnetic pole row is less than a length W, as measured in the moving direction, of the remaining permanent magnets; and
    the number of slots per pole per phase is ⅜, three-eighths; and
    when a pitch between centers of two adjacent magnetic pole portions of the plurality of magnetic pole portions constituting the armature is defined as $\tau s$, the length W of the permanent magnet is defined as $W=\tau s$; and a ratio W1/W of the length W1 to the length W is $0.43<W1/W<0.49$.

2. The linear motor according to claim 1, wherein a spacer, which is made of a nonmagnetic material, is disposed between two adjacent permanent magnets of the plurality of permanent magnets to form a space therebetween.

3. The linear motor according to claim 2, wherein the spacer is formed by cutting a wire material.

4. The linear motor according to claim 1, wherein the permanent magnet magnetic pole row is disposed on the movable element; the base is cylindrical or columnar in shape, and common to all the permanent magnet magnetic pole rows; the plurality of permanent magnets are fixed onto an inner peripheral surface of the base; the armature is disposed on the stator; the stator is partially arranged inside the movable element; the armature is fixed onto a base station via stator fixtures at both ends thereof in the moving direction; a guide block is fixed to the movable element, the guide block is slidably supported by a guide rail disposed on the base station; and the movable element is capable of moving in the moving direction with respect to the stator as the guide block slides on the guide rail.

* * * * *

UNITED STATES PATENT AND TRADEMARK OFFICE
CERTIFICATE OF CORRECTION

| | | |
|---|---|---|
| PATENT NO. | : 7,701,093 B2 | Page 1 of 1 |
| APPLICATION NO. | : 12/044383 | |
| DATED | : April 20, 2010 | |
| INVENTOR(S) | : Tang et al. | |

It is certified that error appears in the above-identified patent and that said Letters Patent is hereby corrected as shown below:

On the Title Page, in Field (74), under "Attorney, Agent, or Firm" in Column 2, Line 1, delete "Clarke" and insert -- Clark --

Signed and Sealed this

Sixth Day of July, 2010

David J. Kappos
*Director of the United States Patent and Trademark Office*